(12) United States Patent
Erickson et al.

(10) Patent No.: US 6,922,596 B2
(45) Date of Patent: Jul. 26, 2005

(54) EFFICIENT ADAPTIVE FEEDFORWARD PERIODIC DISTURBANCE COMPENSATION

(75) Inventors: Mark A. Erickson, San Bruno, CA (US); Cecilia Galarza, San Francisco, CA (US); Dan Hernandez, Cupertino, CA (US); Sunil C. Shah, Los Altos, CA (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/638,244

(22) Filed: Aug. 7, 2003

(65) Prior Publication Data

US 2004/0030416 A1 Feb. 12, 2004

Related U.S. Application Data

(63) Continuation of application No. 09/517,948, filed on Mar. 3, 2000, now Pat. No. 6,684,114.

(51) Int. Cl.[7] .............................................. G05B 13/02
(52) U.S. Cl. .............................. 700/54; 700/28; 700/32; 360/75; 360/77.04; 360/78.04
(58) Field of Search ............................. 700/54, 55, 78, 700/44, 45, 32, 28; 360/75, 77.04, 78.04

(56) References Cited

U.S. PATENT DOCUMENTS

| | | | | | |
|---|---|---|---|---|---|
| 5,233,586 | A | * | 8/1993 | Morisada | 369/44.32 |
| 5,347,447 | A | * | 9/1994 | Kiji et al. | 700/32 |
| 5,402,400 | A | * | 3/1995 | Hamada et al. | 360/78.06 |
| 5,608,586 | A | | 3/1997 | Sri-Jayantha et al. | |
| 5,729,514 | A | * | 3/1998 | Horigome et al. | 369/47.17 |
| 5,757,641 | A | * | 5/1998 | Minto | 700/4 |
| 5,784,272 | A | * | 7/1998 | Schootstra et al. | 700/38 |
| 5,818,651 | A | * | 10/1998 | Nomura | 360/78.06 |
| 5,872,439 | A | * | 2/1999 | Nomura | 318/632 |
| 5,995,316 | A | * | 11/1999 | Stich | 360/77.04 |
| 6,208,949 | B1 | * | 3/2001 | Eatwell | 702/189 |
| 6,278,898 | B1 | * | 8/2001 | Shah | 700/29 |
| 6,347,017 | B1 | * | 2/2002 | Carlson | 360/77.04 |
| 6,404,581 | B1 | * | 6/2002 | Shah | 360/75 |
| 6,417,983 | B1 | * | 7/2002 | Yatsu | 360/77.04 |
| 6,459,663 | B1 | * | 10/2002 | Hayami | 369/44.29 |

OTHER PUBLICATIONS

Alexei H. Sacks, Marc Bodson & William Messner, "Advanced Methods for Repeatable Runout Compensation," Data Storage Systems Center, Carnegic Mellon University, Pittsburgh, PA 15213–3890, USA.

Carl Kempf, Williams Messner, Masayoshi Tomizuka, & Roberto Horowitz, "Comparison of Four Discrete–Time Repetitive Control Algorithms," pp. 48–54, Dec. 1993.

* cited by examiner

*Primary Examiner*—Anthony Knight
*Assistant Examiner*—Thomas Pham
(74) *Attorney, Agent, or Firm*—Wood, Herron & Evans, L.L.P.

(57) ABSTRACT

A system and method is given for minimizing periodic disturbances in electronic systems. Given the input-output characteristics of the system, the present method identifies and cancels the periodic disturbance. The periodic disturbance parameters are identified through the use of a residual generator. The output of the residual generator is fed into an identifier that estimates disturbance parameters. The compensation filter combines the output of the identifier with a set of pre-computed parameters to form a cancellation signal. This signal is then added to the input of the plant to cancel the periodic disturbance.

3 Claims, 8 Drawing Sheets

EFFICIENT ADAPTIVE FEEDFORWARD PERIODIC DISTURBANCE COMPENSATION

This application is a continuation of application Ser. No. 09/517,948, filed on Mar. 3, 2000, now U.S. Pat. No. 6,684,114.

FIELD OF THE INVENTION

The present invention relates to the field of control systems. In particular the present invention diskloses a system and method for minimizing periodic disturbances.

BACKGROUND OF THE INVENTION

Many controlled physical systems include rotating parts. Some examples include machine tools such as CNC lathes and routers as well as rotating data storage products for computers and consumer electronics. In particular, rotating storage devices include hard disk drives, CD players, CD-ROM drives, and DVD players. Accurate control over the position of the data read/write mechanism is critical to the operation of a rotating media storage product. For example, in a hard disk drive system data is stored in magnetic circular tracks on a media platter. Data is read and written by a magnetic head that floats over the circular tracks.

Unmeasured variables may affect the operation of a drive and can cause variations in performance from unit to unit, as well as within a unit during use of the drive. These variables may include temperature, spindle bearing asperity, disk flutter, induced non-repeatable run-out (NRRO), and variable repeatable run-out (RRO).

The rotating parts (disk platters and spindle-motor assemblies) in a rotating data storage device introduce periodic disturbances in the position of the read/write mechanism. In hard disk drives, for example, the track positions are recorded on each disk platter during a servo writing process. Ideally, the track positions are laid out in perfect concentric circles such that, while the disk is spinning, the head need not move since the data is located in a perfect circle relative to the head. However, small errors are made during the servo writing process that result in data tracks that are slightly non-circular. To a head position servo control system, this non-circularity appears as a periodic component in the error between the track position and the head position.

In the examples above and in many other cases the disturbance magnitude is a function of the angular position of the media platter under the read/write mechanism. Many rotating storage devices use sampled-data controllers with a fixed integer number of samples per full rotation of the storage media platter. The disturbances appear to such a sampled data system as signals that have a period that is an exact multiple of the sample time. The fundamental period of such signals is typically the number of samples per full rotation of the storage media platter. An important goal for a read/write mechanism position control system is to minimize the effects of these periodic disturbances.

Other systems suffer from the effects of periodic disturbances as well. Examples include electrical power delivery systems and communications systems that suffer from power line noise at harmonics of the AC power fundamental frequency.

All of these systems can benefit from a compensation scheme that minimizes the effects of periodic disturbances. FIG. 1 illustrates a prior art method for canceling periodic disturbances. This prior art method utilizes "plug-in"compensation where a repetitive compensator is used to augment an existing nominal compensator. FIG. 2 illustrates a prior art method for canceling periodic disturbances. This prior art method utilizes an adaptive feed forward cancellation scheme.

Both of the methods illustrated in FIGS. 1 and 2 have significant drawbacks. They only take as an input the error signal computed from either the plant output or the difference between the plant output and a desired setpoint. As a result, they do not differentiate between periodic disturbances and signals that are created by the feedback control system. The system in FIG. 1 is a feedback compensator and does not allow feed forward cancellation as does the system in FIG. 2. However, the prior art system of FIG. 2 only uses the output of their plant y(t) in its controller. Furthermore, the prior art system of FIG. 2 fails to account for the input/output behavior of the plant.

The RRO compensation methods are particularly difficult for CD-ROM drives. CD players and DVD drives because the error caused by RRO changes every time a disk is inserted into a drive. Furthermore, the error caused by RRO in CD-ROMs, DVDS, and CDs, changes over time based upon the changing rotational velocity of the disk, thus complicating RRO compensation methods.

SUMMARY OF THE INVENTION

A system and method is given for minimizing periodic disturbances in electronic systems. Given the input-output characteristics of the electronic system, the present system identifies and cancels the periodic disturbance. The periodic disturbance parameters are identified through the use of a residual generator. The output of the residual generator is fed into an identifier that estimates disturbance parameters. The compensation filter combines the output of the identifier with a set of pre-computed parameters to form a cancellation signal. This signal is then added to the input of the plant to cancel the periodic disturbance.

Other features and advantages of the present invention will be apparent from the accompanying drawings and from the following detailed description.

BRIEF DESCRIPTION OF THE DRAWINGS

The objects, features and advantages of the present invention will be apparent to one skilled in the art in view of the following detailed description in which.

DETAILED DESCRIPTION OF THE PREFERRED EMBODIMENT

Figure 1:
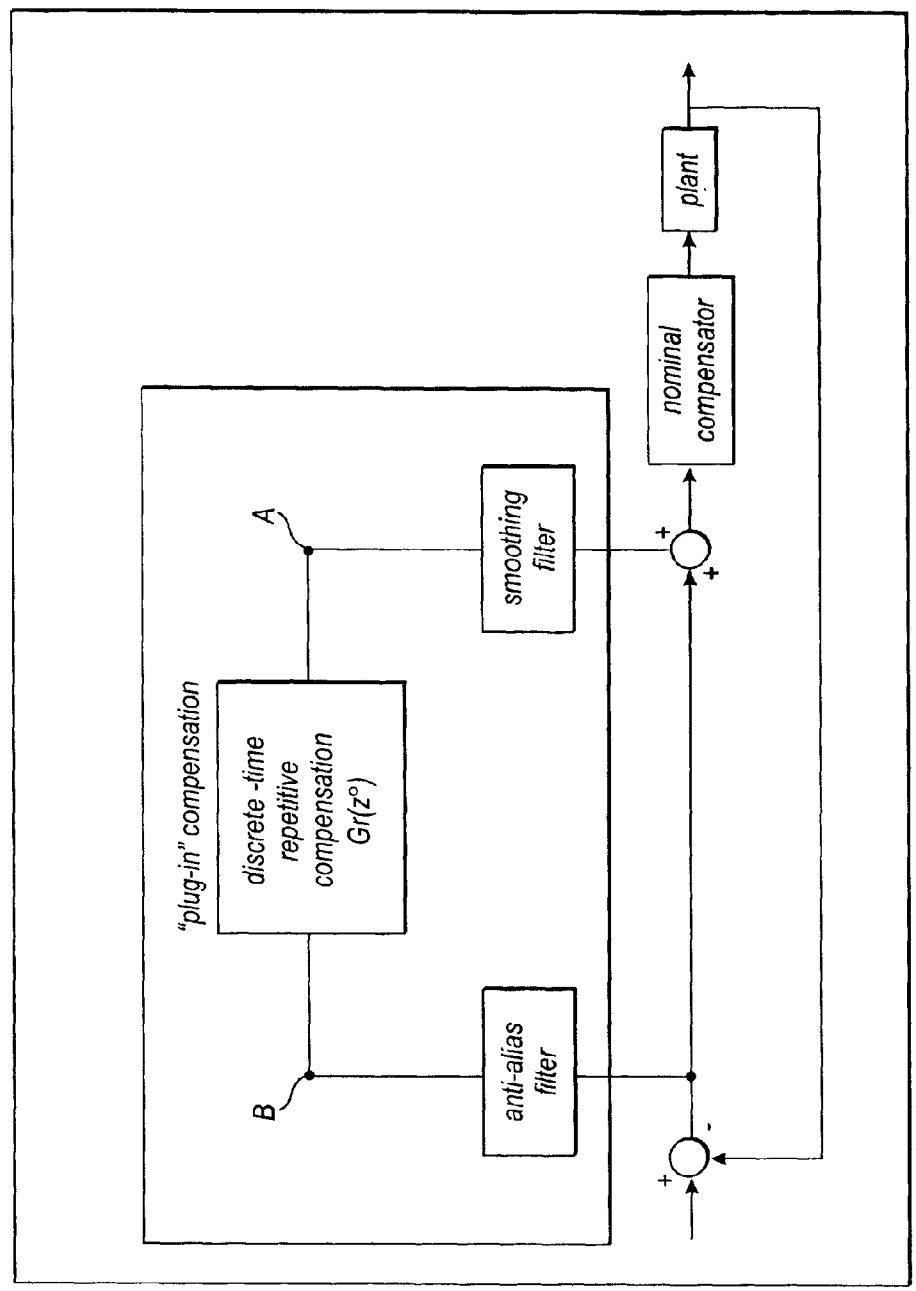
FIG. 1 illustrates a prior art "plug-in" repetitive compensation scheme.
Figure 2:
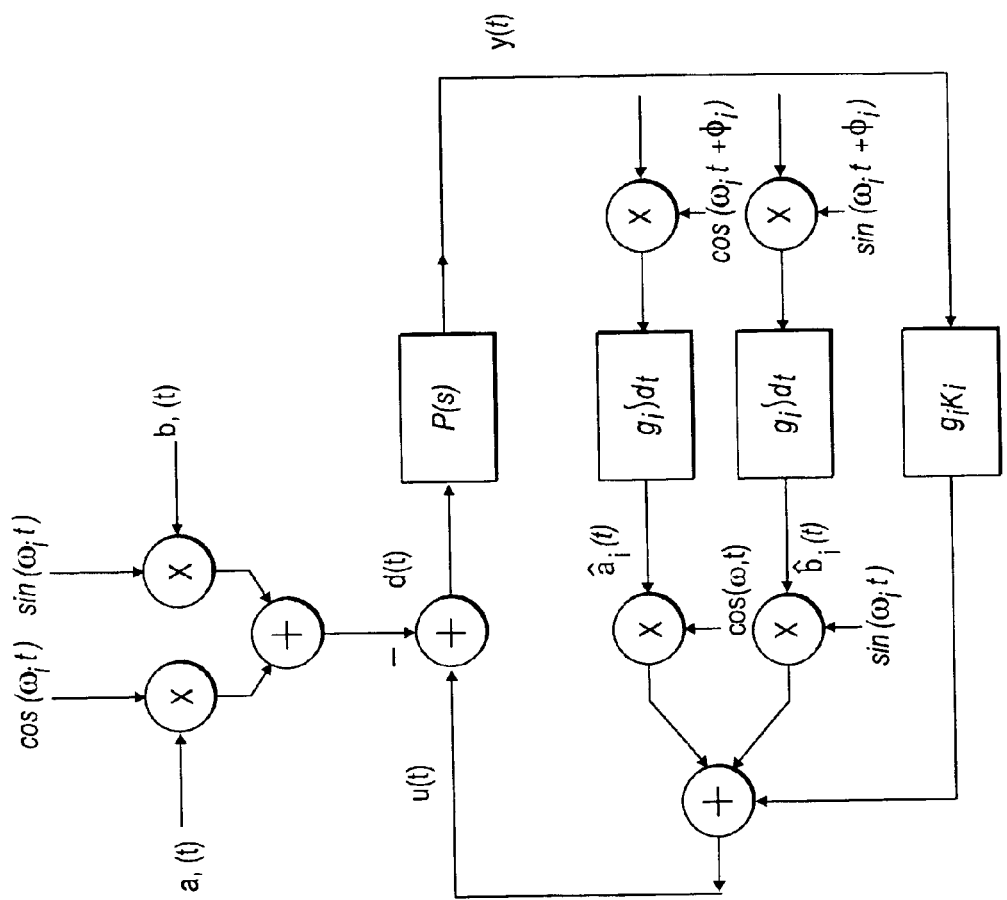
FIG. 2 illustrates a prior art Adaptive Feed Forward Compensation Scheme.

A method and apparatus for Adaptive Feed-Forward Disturbance Cancellation is disklosed. In the following description, for purposes of explanation, specific nomenclature is set forth to provide a thorough understanding of the present techniques. However, it will be apparent to one skilled in the art that these specific details are not required in order to practice the present techniques. For example, the elements of the present techniques described may implement embodiments utilizing all hardware or any combination of hardware and software.

Disturbances associated with systems having rotating parts may be characterized as Repeatable-Run-Out (RRO) or Non-Repeatable-Run-Out (NRRO). RRO disturbances are periodic and phase-locked to the angular position of the rotating parts. By way of example in a hard disk drive, if a fixed point were marked on the disk, RRO would cause the magnetic head to be misaligned with the fixed point by the same amount on every rotation. In contrast, NRRO disturbances could be periodic in nature but not phase-locked to the rotation of the disk. Examples of NRRO could be a sudden impact or the vibrations caused by a cooling fan.

The present system, among other things, minimizes the effects of RRO on rotational systems. A system is given that can be modeled by one or more mathematical equations. The input-output characteristics of the model are typically known before the present system is applied to the rotational system. The periodic disturbance must be identified and cancelled on-line. The present system identifies and cancels the periodic disturbance.

The periodic disturbance parameters are identified through the use of a residual generator. The residual generator could be implemented as a Kalman filter having numerous realization structures. The output of the residual generator is fed into an identifier. The output of the identifier is an estimate of the disturbance parameters.

A compensation filter combines the output of the identifier with a set of pre-computed parameters to form a cancellation signal. This signal is then added to the input of the plant to cancel the periodic disturbance. The residual generator, identifier, and compensation filter are all diskrete-time systems that are updated at every sample k.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following diskussion, it is appreciated that throughout the description, diskussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present system also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks. optical disks, CD-ROMs, and magnetic-optical disks, read-only memories (ROMs). random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present system is not described with reference to any particular programming language. It will be appreciated that a variety of programming languages may be used to implement the teachings of the system as described herein.

The control scheme described herein may be implemented with a wide variety of systems including acoustical, mechanical, and electrical systems. For example, the control scheme described herein may be used to provide control of periodic disturbances caused in a disk drive system as diskussed below.

Figure 3:
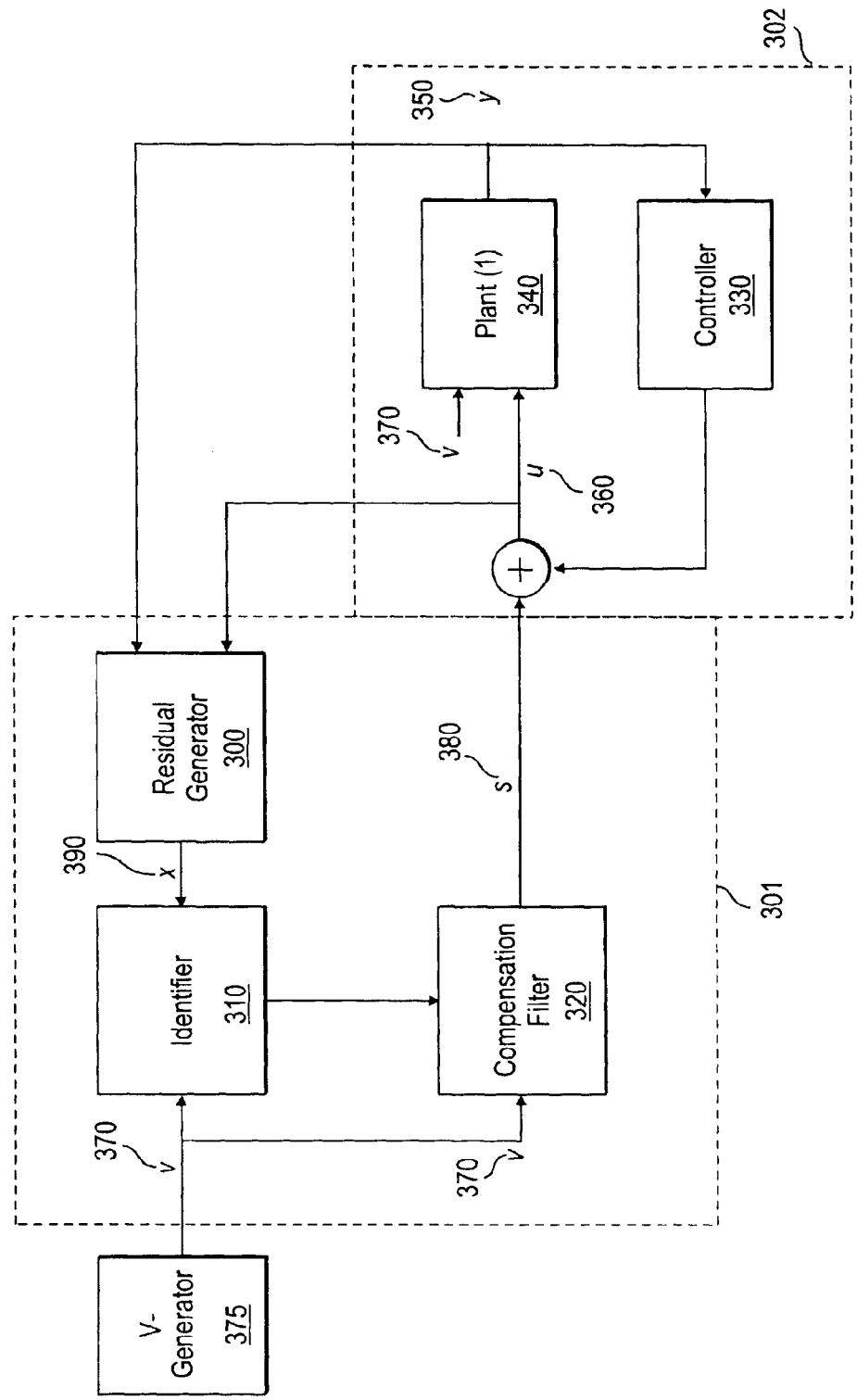
FIG. 3 illustrates an embodiment of the present system.

FIG. 3 illustrates a system implementing one embodiment of a periodic disturbance compensator 301 designed to compensate for a periodic or quasi-periodic disturbance. It consists of three components.

1. A residual generator 300 that pre-processes plant input signal u 360 and plant output signal y 350. The residual generator is designed to create a signal x 390 that contains only periodic disturbance and random noise components.

2. An identifier 310 is used to compute parameters on-line that characterize the periodic disturbance from the signal x 390.

3. A compensation filter 320 uses the parameters computed by the identifier 310 to form a compensation signal s 380 that cancels the effect of the periodic disturbance on the output of the plant.

A model disturbance signal v 370 is injected into identifier 310 and compensation filter 320 by a v-signal generator 375. When the present system is added to an existing servo control system 302, the compensator 301 identifies the periodic disturbance parameters from the input-output behavior of the servo control system. Next, the compensator 301 injects sinusoids with frequencies at integer multiples of the periods of the periodic disturbance. As a result, the feedback properties of the servo control system 302 are unaffected at other frequencies. The compensator 301 is designed and can be directly analyzed in diskrete time, thereby avoiding the need to convert a continuous-time design into a diskrete-time one and re-analyze its properties.

Periodic Disturbance Compensator Component Design

In one embodiment, the plant 340 shown in FIG. 3 is modeled with the following equation $$y_k = -a_1 y_{k-1} - a_2 y_{k-2} \cdots - a_n y_{k-n} + \qquad (1)$$

$$b_1 u_{k-1} + b_2 u_{k-2} \cdots + b_n u_{k-n} +$$

$$c_1 v_{k-1} + c_2 v_{k-j} + e_k$$

Here, signal u 360 is an input formed by the feedback controller 330, signal y 350 is the output of the plant 340, signal v 370 is a known sinusoid modeled by the equation $v_k = \sin(k \cdot 2\pi/m)$ with a period of m samples, and signal e is Gaussian white noise with a known variance. For a physical system such as the system 302 shown in FIG. 3. signals u 360 and y 350 are signals that can be measured. The signal $e_k$ in equation 1 above is not a separate signal in the physical system that can be measured, but serves to model random disturbances and measurement noise that are present in the system 302. The signal v 370 is also not present as a signal that can be measured. Rather, the signal v 370 can be viewed as part of the model expressed by equation 1. The parameters $c_1$ and $c_2$ of equation 1 are such that the effect of the signal v 370 on the output y 350 matches the behavior of the system 302. The delay constant j seen in equation (1), can be chosen to be any value such that $v_{k-1}$ and $v_{k-j}$ are independent. For example, if m is even, $j \ne 1+im/2$ for all integers i. Choosing j as $j \approx m/4$ results in the signals $v_{k-1}$ and $v_{k-j}$ being nearly orthogonal.

Figure 4:
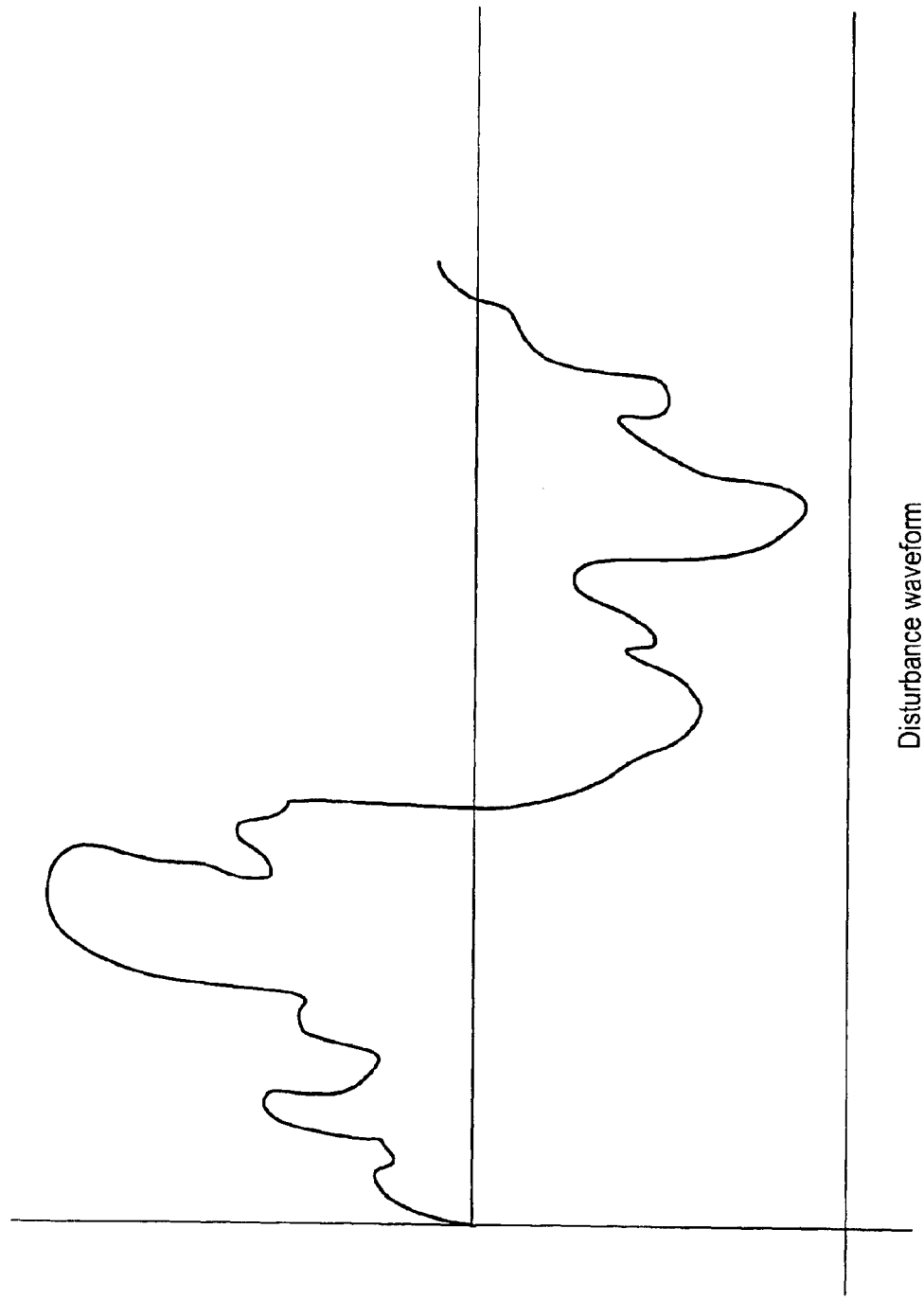
FIG. 4 illustrates a representative Periodic Disturbance waveform.

The model in equation 1 models one sinusoidal disturbance, signal v 370. A periodic disturbance may exist that is not sinusoidal, as shown in FIG. 4. In this case, the non-sinusoidal signal may be approximated via Fourier series as the sum of several sinusoids with periods that are harmonics of the fundamental period. In this case the model in equation 1 is generalized by including several sinusoids $^1v \ldots \,^P v$ with frequencies that are multiples of the fundamental frequency. Each signal has its own pair of parameters $^i c_1$, and $^i c_2$ and delay $^i j$ associated with $^i c_2$. The single sinusoid case will be described below for simplicity. When necessary, the generalization to multiple sinusoids will be described also.

The model described by equation (1) may be obtained from the methods disclosed in U.S. Pat. No. 6,230,062 entitled "ADAPTATION TO UNMEASURED VARIABLES, issued on May 8, 2001, assigned to the assignee of the application herein, and incorporated herein by reference.

Compensation Filter Design

The compensation filter is designed to filter the model disturbance signal v 370 to create a signal s 380. As described above, the model disturbance signal v 370 is not directly measurable by the servo control system 302. The model disturbance signal v 370 is created by a v-generator 375. The signal s 380 is injected into the plant input by adding it to an existing controller for the plant as shown in FIG. 3. In the context of FIG. 3 and equation 1, the compensation filter is designed to compute a signal s 380 and add it to signal u 360 to cancel the effect of model disturbance signal v 370 on the output signal y 350 given known parameter vectors $[a_1 \ldots a_n]$, $[b_1 \ldots b_n]$, $[c_1, c_2]$. By way of example, the compensation filter is described for the case where the delay j=2 A person with ordinary skill in the art can modify the filter for other values of the delay j.

A signal s 380 is described such that $$b_1 s_{k-1} + b_2 s_{k-2} \ldots + b_n s_{k-n} = -c_1 v_{k-1} - c_2 v_{k-2} \qquad (2)$$

By defining $^s u_k = u_k + s_k$, and substituting $^s u_k$ into equation (1), equation (3) results:

$$\begin{aligned} y_k &= -a_1 y_{k-1} - a_2 y_{k-2} \cdots - a_n y_{k-n} + \\ & \quad b_1^s u_{k-1} + b_2^s u_{k-2} \cdots + b_n^s u_{k-n} + \\ & \quad c_1 v_{k-1} + c_2 v_{k-2} + e_k \\ &= -a_1 y_{k-1} - a_2 y_{k-2} \cdots - a_n y_{k-n} + \\ & \quad b_1 u_{k-1} + b_2 u_{k-2} \cdots + b_n u_{k-n} + e_k \end{aligned} \qquad (3)$$

thereby removing the effect of signal $v_k$ 370 on the output signal $y_k$ 350. Implementing equation 2 as a filter to compute signal s 380 from signal v 370 is not desirable for several reasons. First, the filter defined by equation 2 might be unstable if one or more of the roots of the polynomial $b_1 z^{-1} + \ldots + b_n z^{-n}$ are larger than 1. Second, even if it is stable, the filter may have internal modes that are poorly damped or decay slowly. Third, the order of the filter depends on the order of the model represented by equation 1 and may be quite high in some cases.

Since signal v 370 is a sinusoid, the signal s 380 is also a sinusoid that satisfies equation (2). Let V be the Z-transform of signal v 370 and S be the Z-transform of signal s 380. Then $$S = \frac{-c_1 - c_2 z^{-1}}{b_1 + b_2 z^{-1} \cdots + b_n z^{n-1}} V \qquad (4)$$

If the definitions of $\alpha_1$, and $\alpha_2$ are as follows $$\alpha_1 = \left( \frac{-1}{b_1 + b_2 z^{-1} \cdots + b_n z^{n-1}} \right) \bigg|_{z = e^{j\omega}} \text{ and } \qquad (5)$$

$$\alpha_2 = \left( \frac{-z^{-1}}{b_1 + b_2 z^{-1} \cdots + b_n z^{n-1}} \right) \bigg|_{z = e^{j\omega}}$$

where $\omega = 2\pi/m$ is the frequency of signal v 370 and signal s 380, then $$S = (\alpha_1 c_1 + \alpha_2 c_2) V \qquad (6)$$

By using the inverse Z-transform to convert back to the time domain, the desired signal s 380 is obtained. Computing signal s 380 from signal v 370 using these expressions requires transforms and complex calculations.

To compute s from v using real arithmetic, a pair of real parameters $f_1$ and $f_2$ are defined such that $$\alpha_1 = (f_1 + f_2 z^{-1}) \big|_{z = e^{j\omega}} \quad \text{and} \quad \alpha_2 = (f_1 z^{-1} + f_2 z^{-2}) \big|_{z = e^{j\omega}} \qquad (7)$$

By substituting equation 7 back into equation 6, $$S = (f_1 c_1 + (f_2 c_1 + f_1 c_2) z^{-1} + f_2 c_2 z^{-2}) V. \qquad (8)$$

Equation 8 can be realized in the time domain as a 3-tap FIR filter with real coefficients as follows:

$$s_k = f_1 c_1 v_k + (f_2 c_1 + f_1 c_2) v_{k-1} + f_2 c_2 v_{k-2}. \qquad (9)$$

In one embodiment, the signal s can be computed from a 2-tap FIR filter. The signal s may be formed by any means that creates a sinusoid with the desired phase and magnitude. By defining a pair of real parameters $\gamma_1$ and $\gamma_2$ such that $$\gamma_2 = \frac{\sin(-2\omega)}{\sin(-\omega)} \quad \text{and} \quad \gamma_1 = \cos(-2\omega) - \gamma_2\cos(-\omega) \qquad (10)$$

it can be shown via manipulation of basic trigonometric identities that $$v_{k-2} = \gamma_1 v_k + \gamma_2 v_{k-1}. \qquad (11)$$

By substituting equation 11 into equation 9, $$s_k = (f_1 c_1 + f_2 c_2 \gamma_1) v_k + (f_2 c_1 + f_1 c_2 + f_2 c_2 \gamma_2) v_{k-1}. \qquad (12)$$

This expression can be written using matrix notation as:

$$s_k = [v_k, v_{k-1}]\begin{bmatrix} f_1 & \gamma_1 f_2 \\ f_2 & f_1 + \gamma_2 f_2 \end{bmatrix}\begin{bmatrix} c_1 \\ c_2 \end{bmatrix} = [v_k, v_{k-1}]M\begin{bmatrix} c_1 \\ c_2 \end{bmatrix}. \qquad (13)$$

The matrix M of equation 13 depends only on $[a_1 \ldots a_n]$, $[b_1 \ldots b_n]$, and the sinusoid frequency $\omega$. As a result, it may be computed ahead of time. When the parameters $c_1$ and $c_2$ become available, the coefficients of the FIR filter described by equation 12 may be computed with the single real matrix multiply $$M\begin{bmatrix} c_1 \\ c_2 \end{bmatrix}. \qquad (14)$$

This method for forming the signal s 380 is extremely efficient because it uses real arithmetic, computes the signal s 380 using only a 2-tap FIR filter, and computes tile filter coefficients from the $[c_1,c_2]$ parameters using a single real 2×2 matrix multiply.

If the model of equation 1 is generalized so that several sinusoids $^1v \ldots ^Pv$ with frequencies $^1\omega \ldots ^P\omega$ are present and each has its own pair of parameters $^ic_1$ and $^ic_2$, an individual cancellation signal $^is$ can be computed for each $^iv$. The signals $^1s \ldots ^Ps$ can all be added to the input u 360 to remove the p sinusoids from the output y 350.

Identifier and Residual Generator Design

If all of the parameter vectors $[a_1 \ldots a_n]$, $[b_1 \ldots b_n]$, and $[c_1, c_2]$ are known, the compensation filter is all that is necessary to compensate for periodic disturbances. However, parameter vectors $[c_1, c_2]$ are rarely known. By way of example, the case where vectors $[a_1 \ldots a_n]$, $[b_1 \ldots b_n]$ are known, $[c_1, c_2]$ are not and input and output data for the system described by the model of equation 1 are given, the $[c_1, c_2]$ parameters should be identifiable. The parameters are identified using only real arithmetic, and are efficient to implement in real time.

In one embodiment consistent with the Compensation Filter Design description above, the residual generator 300 and Identifier 310 are described for a single sinusoid signal v 370 and the delay j=2. One skilled in the art may extend the design to multiple sinusoids and other values of j.

The residual generator 300 contains data that models the plant 340. The residual generator 300 is an estimator that takes as inputs signals y 350, and u 360, and with the modeling data of the plant removes the Input/Output behavior of the plant, leaving only the estimated disturbances. The disturbances are modeled as signal x 390, which is the output of the residual generator 300.

A signal x 390 is computed from the signals ti 360 and y 350 via the expression $$x_k = y_k + a_1 y_{k-1} + a_2 y_{k-2} \ldots + a_n y_{k-n} - b_1 u_{k-1} - b_2 u_{k-2} \ldots - b_n u_{k-n} \qquad (15)$$

Equation 15 defines the residual generator 300. The residual generator (300) is an FIR filter with two inputs, signal u 360 and signal y 350, and one output. signal x 390. Hence, it is stable and may be implemented with real arithmetic.

The identifier 310 takes the signal x 390 from the residual generator 300 and creates parameters for the compensation signal s 380. These parameters are provided to the compensation filter 320, which combines them with model disturbance signal v 370 and cancels the disturbance by injecting compensation signal s 380 into the plant 340. Thus, in one embodiment the Identifier 310 can be modeled as follows:

By substituting equation 15 into equation 1 equation 16 is obtained:

$$x_k = c_1 v_{k-1} + c_2 v_{k-2} + e_k \qquad (16)$$

By defining $$r = [c_1, c_2]' \text{ and } g_k = [v_{k-1}, v_{k-2}] \qquad (17)$$

where, $[c_1,c_2]'$ signifies the transpose of $[c_1,c_2]$, equation 16 becomes $$x_k = g_k r + e_k \qquad (18)$$

The estimate of the parameter vector r at time k is defined to be $\hat{r}_k$. The identifier 310 uses the signals x 390 and v 370 to compute $\hat{r}$ such that $\hat{r}$ is a good estimate of r. In one embodiment, the Least-Mean-Square (LMS) adaptive identification law is $$\hat{r}_{k-1} = \hat{r}_k + \epsilon g'_k(x_k - g_k \hat{r}_k) \qquad (19)$$

Here $\epsilon$ is an adjustable adaptation gain. If several signals $^1v \ldots ^Pv$ are present, equation 16 may be expressed as $$x_k = {}^1c_1 {}^1v_{k-1} + {}^1c_2 {}^1v_{k-2} + \ldots + {}^Pc_1 {}^Pv_{k-1} + {}^Pc_2 {}^Pv_{k-2} + e_k \qquad (20)$$

The definitions in equation 17 then become $$r = [{}^1c_1, {}^1c_2, \ldots, {}^Pc_1, {}^Pc_2]' \text{ and} \qquad (21)$$

$$g_k = [{}^1v_{k-1}, {}^1v_{k-2}, \ldots, {}^Pv_{k-1}, {}^Pv_{k-2}]$$

By substituting equation 21 into equation 20, the expression in equation 18 results and the adaptation law represented by equation 19 still applies. Modification for different delay values associated with $^iv$ is similarly direct. In addition, a separate $^i\epsilon$ can be set for each pair of parameters being identified.

V-signal Generator and Variable Rotation Rate Systems

Figure 5:
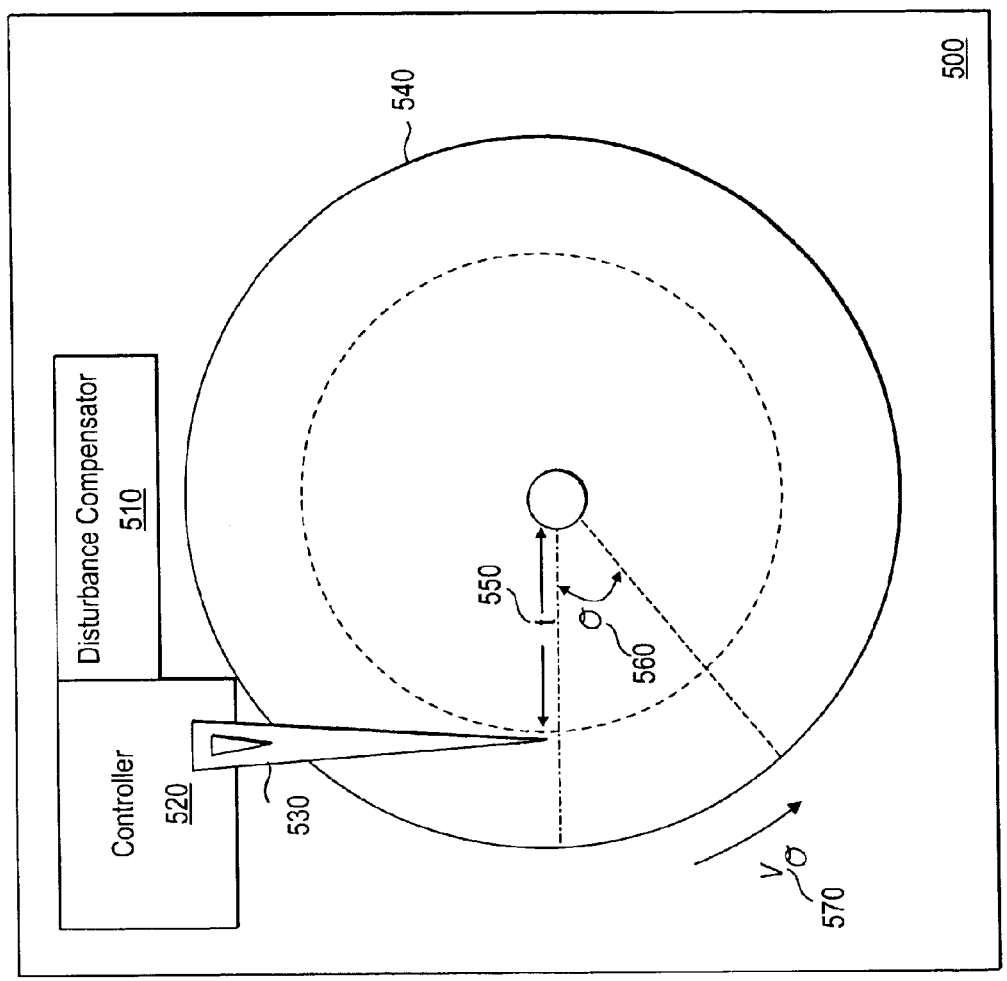
FIG. 5 illustrates a spinning media system implementing one embodiment of a disturbance compensator.

FIG. 5 shows a spinning media system 500 implementing one embodiment of the disturbance compensator 500 described above. The disturbance compensator is coupled to a controller 520. The controller 520 controls the reading head 530. The reading head 530, however, could be any media reading device such as a laser or optical pick-up (OPU) for compact disk (CD), CD-ROM and digital video disk (DVD) systems. or a magnetic head for hard disk drives or other magnetic storage media. The head 530 reads data at a point on the media platter 540 having radial position r 550 and angular position θ 560. In addition, media platter 540 spins at an angular velocity $V_\theta$ 570. In hard disk drive systems as diskussed above, $V_\theta$ 570 is fixed. However, in systems such as CDs, CD-ROMs and DVDs, $V_\theta$ is variable. In such devices, the frequency of rotation slows down to maintain a constant linear bit rate as an optical pick-up (OPU) follows a spiral track from the inside of the disk to the outside of the disk. Hence, the frequencies at which RRO occur vary depending upon the position of the OPU over the disk. However, the shifting of the frequencies over the radius of the disk is known, allowing adaptive RRO compensation to be applied. Disturbance compensator 510 includes a v-signal generator that compensates for a variable $V_\theta$ as shown in FIG. 6.

Figure 6:
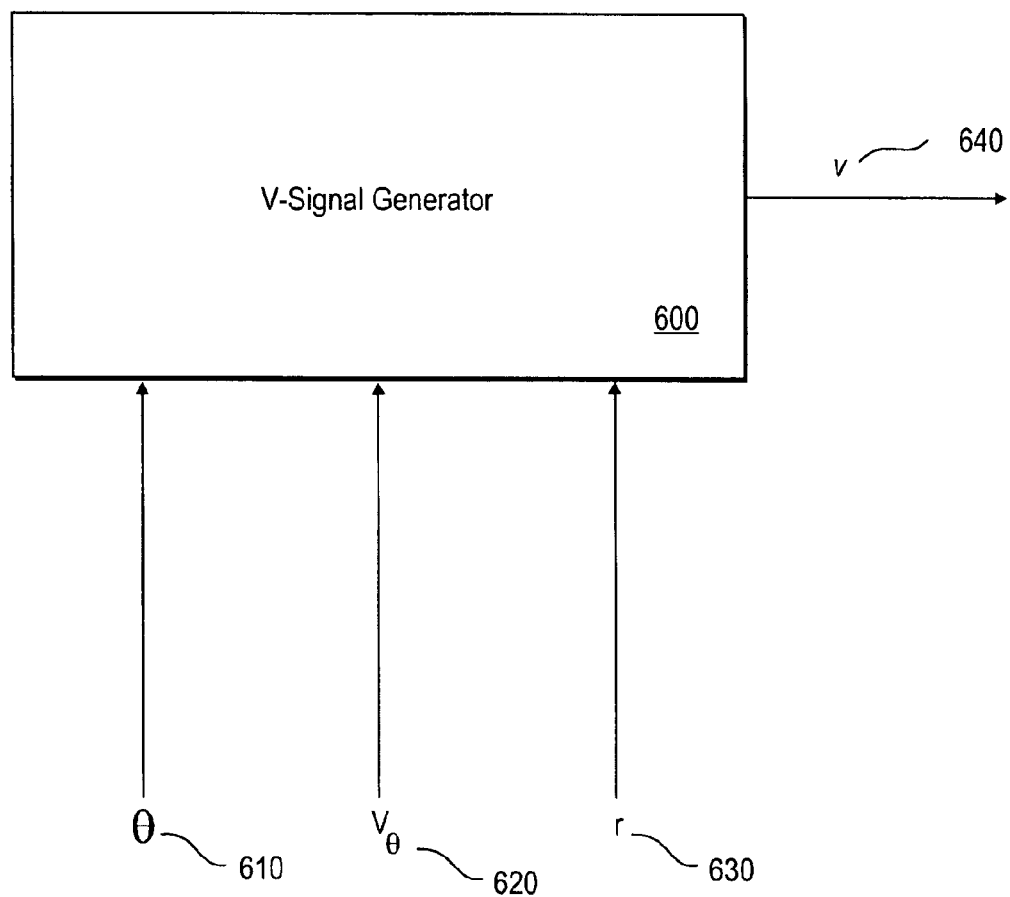
FIG. 6 illustrates one embodiment of a v-signal generator.

FIG. 6 shows one embodiment of a v-signal generator 600 that outputs a model disturbance signal v 640 which would be injected into a disturbance compensator such as the one shown in FIG. 3. Model disturbance signal v 640, as described in detail above, represents a sinusoid having a frequency related to the angular velocity $V_\theta$ 620 of a spinning disk, such as a CD, CD-ROM or DVD system or magnetic media such as a hard disk.

The v-signal generator 600 takes as inputs radial position r 630, angular position θ 610, and angular velocity $V_\theta$ 620. The model disturbance signal v 640 may be computed from any of the inputs or any combination thereof. For example, in a fixed rotation rate system, the angular velocity $V_\theta$ 620 and angular position θ 610 are sufficient to generate model disturbance signal v 640. In another embodiment, in a variable rotation rate system, the radial position r 630 and angular position θ 610 are sufficient to generate model disturbance signal v 640.

In one embodiment, instead of generating sinusoids for model disturbance signal v 640 from a look-up table, the sinusoids may be generated by oscillators. The parameters for the oscillators that control their frequencies may be obtained from a look-up table or computed from polynomial functions related to the radial position r 630 of the OPU. If tables are used to update the oscillator's values, then the disk surface may be divided into radial zones. Within these zones, constant fixed parameters or interpolated values may be used. Furthermore, the M matrix of equations 13 and 14 above which depend upon the frequency response of the plant may be obtained at run time. The values of the parameters of the M matrix may be read from tables or generated from polynomial or other functions. Thus, adaptive feed forward RRO compensation described at length above may be applied to systems with either fixed or variable rotation rates.

Sharing Signals and Components with Controller Selectors

The use of signals to select the best controller from a number of candidates is described in the patent application "Adaptation to Unmeasured Variables" referenced above. This description shows how signals used by controller selectors can be generated by modifications of the periodic disturbance compensator described here.

In one embodiment the output of the residual generator 300 expressed in equation 16 is used in the LMS identification law expressed in equation 19. A key expression of equation 19 is $(x_k - g_k \hat{f}_k)$. By defining $\hat{e}_k = (x_k - g_k \hat{f}_k)$, the signal $e_k$ is estimated. If $\hat{f}_k$ is a good estimate for the true parameter vector then $$(x_k - g_k \hat{f}_k) \equiv \hat{e}_k \equiv e_k \tag{22}$$

The signal $\hat{e}_k$ provides a measure for how well the model defined by the parameter vectors $[a_1 \ldots a_n]$ and $[b_1 \ldots b_n]$ describes the input-output behavior of the actual system that is modeled with equation 1. This is precisely the kind of signal used in the controller selector architecture described in the patent application, "Adaptation to Unmeasured Variables," referenced above.

Figure 7:
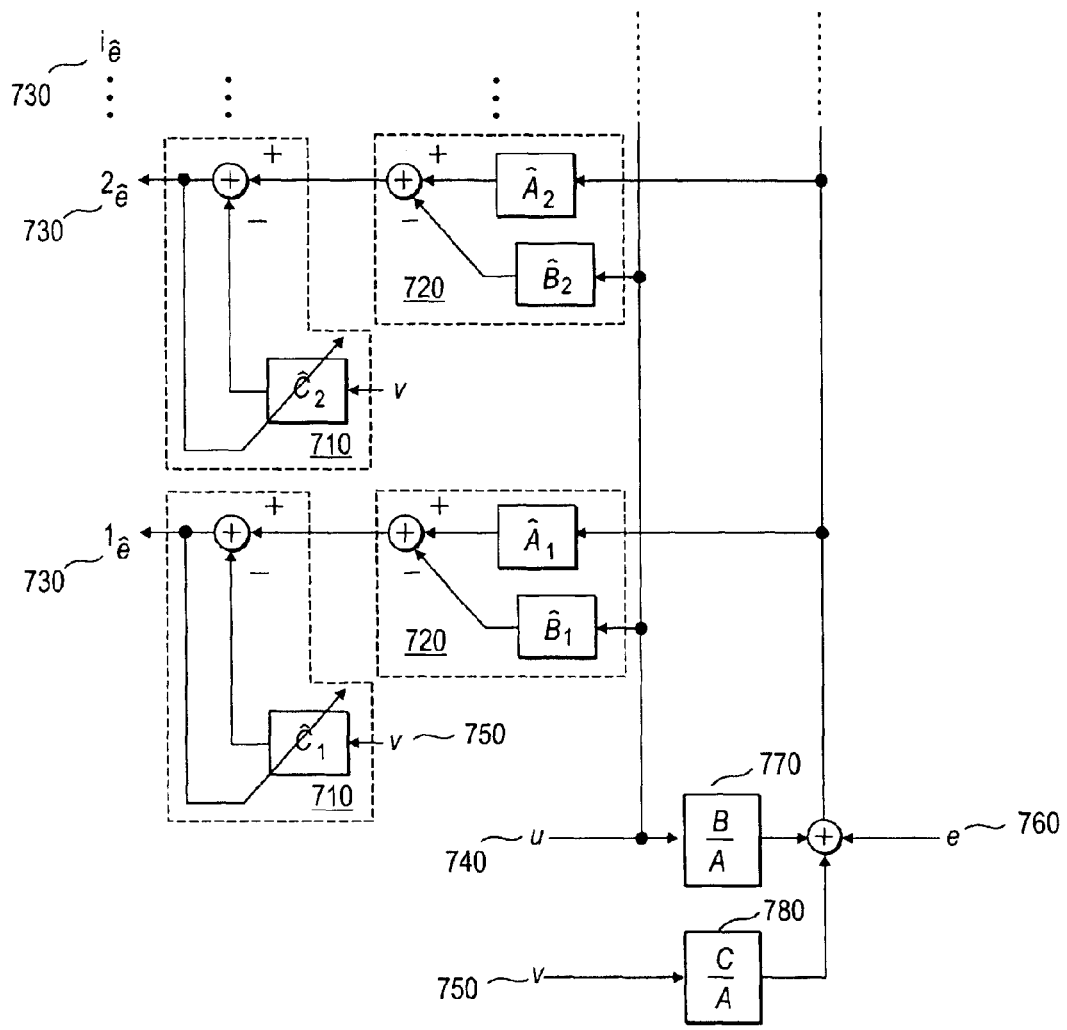
FIG. 7 illustrates a first embodiment for signal sharing between periodic disturbance cancellation and model selection components.

Two possible embodiments for generating error signals from several candidate model equations are described here. The first embodiment is shown in FIG. 7. In this embodiment, a residual generator 720 and identifier 710 are implemented for each candidate model. This architecture is applicable for candidate models that may be very different in character. For each candidate model i, a complete residual generator 710 and c parameter identifier 710 are operated. Each residual generator 720 receives signal u 740, which is an input to the plant 770. Signal v 750 is an input to the controller 780. The output of the plant 770 and the controller 780 are summed with the actual error signal e 760 and provided to the residual generators 720. Each error signal $^i e$ 730 is a byproduct of the residual generating 720 and identification 710 architecture. The structure for the first two candidate models is shown in the figure.

Figure 8:
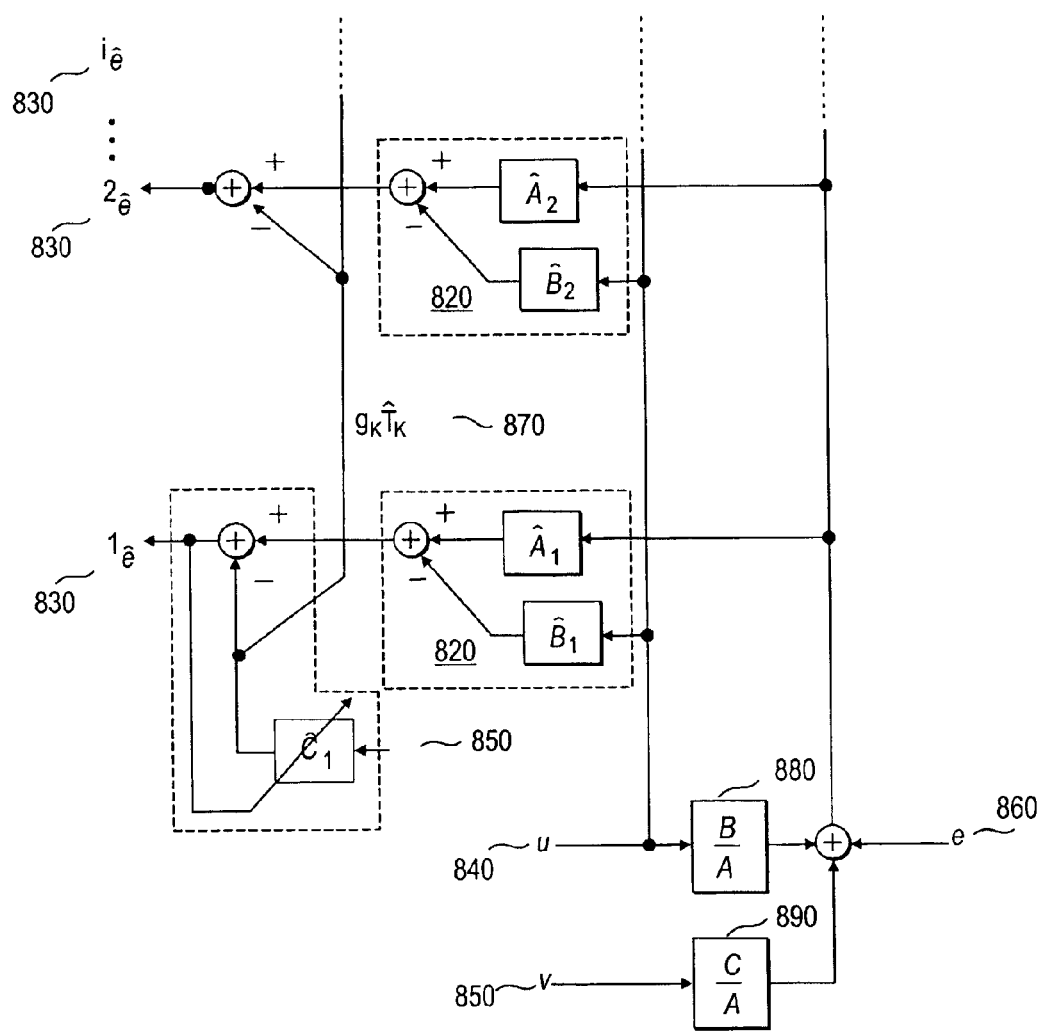
FIG. 8 illustrates a second embodiment for signal sharing between periodic disturbance cancellation and model selection components.

Referring to FIG. 8, the second proposed embodiment for signal sharing between periodic disturbance cancellation and model selection components uses only one c parameter identifier 850. Its output is used by each estimator to form its error signal $^i e$. Each residual generator 820 receives signal u 840, which is an input to the plant 880. Signal v 850 is an input to the controller 890. The output of the plant 880 and the controller 890 are summed with the actual error signal e 860 and provided to the residual generators 820. The structure for the first two candidate models is shown in FIG. 8.

If the input-output transfer functions for all of the candidate models have approximately the same complex values when evaluated at periodic disturbance frequencies w, then the disturbance parameters identified by each identifier 850 will all be approximately the same. In this case, the output $g_k \hat{f}_k$ 870 of each identifier 850 is approximately the same, and only one identifier 850 is implemented. An architecture that generates several error signals using only one identifier 850 is shown in FIG. 8.

Multi-Input Multi-Output Systems

The embodiments described above can easily be extended for multi-input multi-output (MIMO) systems. In Equation 1, each $u_k$ and $y_k$ become vectors and the parameters $a_i$, $b_i$, and $c_i$ all become matrices. The same architecture still applies and the algorithms described here can be directly extended to accommodate such MIMO systems.

The adaptation method expressed by equation 19 is just one of a number of different methods that may be applied to identify the $c_i$ parameters on-line. These include projection algorithms, gradient algorithms, and recursive least squares algorithms as well as others.

The method described to form the cancellation signal $s_k$ 380 from the $c_i$ parameters is a particularly efficient way to do so. It is not the only way, however. Any method that generates the sinusoidal cancellation signal $s_k$ from the $c_i$ parameters can be used to successfully solve the problem.

The examples given for the generation of error signals for use by controller selection schemes remain relevant if any of the extensions and generalizations described above are applied to solve a periodic disturbance cancellation problem.

The foregoing has described an Adaptive Feed-Forward Compensation Scheme. It is contemplated that changes and modifications may be made by one of ordinary skill in the art, to the materials and arrangements of elements of the present system without departing from the scope of the system.

What is claimed is:

1. A media platter spinning system for minimizing periodic disturbances in an electronic system thereof, said media platter spinning system comprising:

a spinning media platter having an electronic input and an electronic output;

a controller having an input electronically coupled to the output of the spinning media platter and an output electronically coupled to the input of the spinning media platter;

a filter having an output and being responsive to the input and the output of the spinning media platter and to filter therefrom an estimated disturbance signal;

an identifier responsive to the estimated disturbance signal to produce compensation parameters therefrom;

a model disturbance signal generator to produce a model disturbance signal;

a compensation filter responsive to the compensation parameters and the model disturbance signal to produce a compensation signal; and the compensation signal being coupled to the input of the spinning media platter.

2. The system as claimed in claim 1 wherein the identifier includes a spinning media platter model signal generator.

3. The system as claimed in claim 1 wherein the estimated disturbance signal includes only periodic disturbance and random noise components of the spinning media platter output.

* * * * *

UNITED STATES PATENT AND TRADEMARK OFFICE
CERTIFICATE OF CORRECTION

PATENT NO.    : 6,922,596 B2
DATED         : July 26, 2005
INVENTOR(S)   : Mark A. Erickson et al.

It is certified that error appears in the above-identified patent and that said Letters Patent is hereby corrected as shown below:

Title page,
Item [56], References Cited, OTHER PUBLICATIONS,
"…"Advanced Methods for Repeatable Runout Compensation," Data Storage Systems Center, Carnegic Mellon University, Pittsburgh, PA 15213-3890, USA." should read -- …"Advanced Methods for Repeatable Runout Compensation," Data Storage Systems Center, Carnegie Mellon University, Pittsburgh, PA 15213-3890, USA. --.
"Carl Kempf, Williams Messner, Masayoshi Tomizuka, &..." should read -- Carl Kempf, William Messner, Masayoshi Tomizuka, &… --.

Column 1,
Line 11, reads "…systems. In particular the present invention diskloses a …" and should read -- …systems. In particular the present invention discloses a … --.

Column 2,
Line 20, reads "…for CD-ROM drives. CD players and DVD drives because…" and should read -- … for CD-ROM drives, CD players and DVD drives because… --.
Line 67, reads "…turbance Cancellation is disklosed. In the following…" and should read -- …turbance Cancellation is disclosed. In the following… --.

Column 3,
Line 39, reads "… identifier, and compensation filter are all diskrete-time…" and should read -- …identifier, and compensation filter are all discrete-time… --.
Lines 61-62, read "…apparent from the following diskussion, it is appreciated that throughout the description, diskussions utilizing terms such…" and should read -- …apparent from the following discussion, it is appreciated that throughout the description, discussions utilizing terms such… --.

Column 4,
Lines 12-14, read "…including floppy disks. optical disks, CD-ROMs, and magnetic-optical disks, read-only memories (ROMs). random access memories (RAMs), EPROMs, EEPROMs,…" and should read -- …including floppy disks, optical disks, CD-ROMs, and magnetic-optical disks, read-only memories (ROMs), random access memories (RAMs), EPROMs, EEPROMs,… --.
Lines 33-34, read "…periodic disturbances caused in a disk drive system as diskussed below." and should read -- …periodic disturbances caused in a disk drive system as discussed below. --.
Line 60, reads "…designed and can be directly analyzed in diskrete time,…" and should read -- …designed and can be directly analyzed in discrete time,… --.
Line 62, reads, "…design into a diskrete-time one and re-analyze its properties." and should read -- …design into a discrete-time one and re-analyze its properties. --.

UNITED STATES PATENT AND TRADEMARK OFFICE
CERTIFICATE OF CORRECTION

PATENT NO.    : 6,922,596 B2
DATED         : July 26, 2005
INVENTOR(S)   : Mark A. Erickson et al.

It is certified that error appears in the above-identified patent and that said Letters Patent is hereby corrected as shown below:

Column 5,
Line 37, reads, "…$^i c_1$, and $^i c_2$ and delay $^i j$ associated with $^i c_2$. The single…" and should read -- …$^i c_1$ and $^i c_2$ and delay $^i j$ associated with $^i c_2$. The single… --.
Lines 44-45, read, "…entitled "ADAPTATION TO UNMEASURED VARIABLES, issued on May 8, 2001, assigned to the…" and should read -- …entitled ADAPTATION TO UNMEASURED VARIABLES, issued on May 8, 2001, assigned to the… --.
Line 62, reads, "… case where the delay j=2 A person with ordinary skill in the…" and should read -- …case where the delay j=2. A person with ordinary skill in the… --.

Column 7,
Line 21, reads, "…$[b_1 … b_n]$. and the sinusoid frequency ω. As a result, it may…" and should read -- …$[b_1 … b_n]$, and the sinusoid frequency ω. As a result, it may… --.
Line 33, reads, "…s 380 using only a 2-tap FIR filter, and computes tile filter…" and should read -- … s 380 using only a 2-tap FIR filter, and computes the filter… --.
Line 38, reads, "… and each has its own pair of parameters $^i c_1$ and $^i c_2$. an …" and should read -- … and each has its own pair of parameters $^i c_1$ and $^i c_2$, an… --.

Column 8,
Line 1, reads, "A signal x 390 is computed from the signals ti 360 and y…" and should read -- A signal x 390 is computed from the signals $u$ 360 and y… --.
Line 7, reads, "…signal u 360 and signal y 350, and one output. signal x 390." and should read -- …signal u 360 and signal y 350, and one output, signal x 390. --.

Line 36, (equation 19) reads, " $\hat{r}_{k-1} = \hat{r}_k + eg^1_k(x_k - g_k \hat{r}_k)$ " and should read
-- $\hat{r}_{k+1} = \hat{r}_k + eg^1_k(x_k - g_k \hat{r}_k)$ --.

Line 65, reads, "…disk (DVD) systems. or a magnetic head for hard disk drives…" and should read -- …disk (DVD) systems, or a magnetic head for hard disk drives… --.

Column 9,
Line 3, reads, "…systems as diskussed above, $V_\theta$ 570 is fixed. However, in…" and should read -- …systems as discussed above, $V_\theta$ 570 is fixed. However, in… --.

UNITED STATES PATENT AND TRADEMARK OFFICE
CERTIFICATE OF CORRECTION

PATENT NO. : 6,922,596 B2
DATED : July 26, 2005
INVENTOR(S) : Mark A. Erickson et al.

It is certified that error appears in the above-identified patent and that said Letters Patent is hereby corrected as shown below:

<u>Column 10,</u>
Line 15, reads, "...generator 710 and c parameter identifier 710 are operated." and should read -- ...generator 720 and c parameter identifier 710 are operated. --.
Lines 21-22, read, "...provided to the residual generators 720. Each error signal $^i$[line break] e 730 is a byproduct of the residual generating 720 and..." and should read -- ...provided to the residual generators 720. Each error signal $^i$e 730 is a byproduct of the residual generating 720 and... --. (No line break)
Line 37, reads, "...when evaluated at periodic disturbance frequencies w, then..." and should read -- ...when evaluated at periodic disturbance frequencies $\omega$, then... --.

Signed and Sealed this

Ninth Day of May, 2006

JON W. DUDAS
*Director of the United States Patent and Trademark Office*